(12) United States Patent
Yu et al.

(10) Patent No.: US 11,321,260 B2
(45) Date of Patent: May 3, 2022

(54) USB HUB DEVICE HAVING FUNCTIONALITY OF SELF FIRMWARE UPDATING AND HOST ELECTRONIC SYSTEM HAVING THE SAME

(71) Applicant: PROLIFIC TECHNOLOGY INC., Taipei (TW)

(72) Inventors: Tien-Wei Yu, Hsinchu (TW); Cheng-Sheng Chan, Hsinchu (TW); Chun-Shiu Chen, Taipei (TW)

(73) Assignee: PROLIFIC TECHNOLOGY INC., Taipei (TW)

( * ) Notice: Subject to any disclaimer, the term of this patent is extended or adjusted under 35 U.S.C. 154(b) by 0 days.

(21) Appl. No.: 17/152,906

(22) Filed: Jan. 20, 2021

(65) Prior Publication Data

US 2022/0027300 A1 Jan. 27, 2022

(30) Foreign Application Priority Data

Jul. 22, 2020 (TW) .................................. 109124784

(51) Int. Cl.
  *G06F 13/38* (2006.01)
  *G06F 8/65* (2018.01)
(52) U.S. Cl.
  CPC .............. *G06F 13/382* (2013.01); *G06F 8/65* (2013.01); *G06F 2213/0042* (2013.01); *G06F 2213/3812* (2013.01); *G06F 2213/4002* (2013.01)

(58) Field of Classification Search
  CPC ..... G06F 21/85; G06F 21/572; G06F 9/45504
  See application file for complete search history.

(56) References Cited

U.S. PATENT DOCUMENTS

| | | | |
|---|---|---|---|
| 2017/0004301 A1* | 1/2017 | Hsu ......................... | G06F 21/85 |
| 2017/0315799 A1* | 11/2017 | Kawaguchi .............. | G06F 3/123 |
| 2018/0081843 A1* | 3/2018 | Kadgi ...................... | G06F 13/20 |
| 2018/0114024 A1* | 4/2018 | Dasari ................... | G06F 21/572 |
| 2018/0210744 A1* | 7/2018 | Shih .................... | G06F 9/45504 |
| 2018/0239728 A1* | 8/2018 | Emerson ............. | G06F 13/4282 |

* cited by examiner

*Primary Examiner* — Getente A Yimer

(57) ABSTRACT

A USB hub device having functionality of self firmware updating is disclosed. The USB hub device is integrated in a host electronic system, and comprises an upstream port, a plurality of downstream ports and a hub module comprising a plurality of second USB controller units. On the other hand, the host electronic system has a second USB controller unit. After one electronic device is coupled to one downstream port, the first USB controller unit sends a detection signal for verifying whether the electronic device includes at least one firmware update data or not. In case of the electronic device being verified to have the firmware update data, the hub module transmit the firmware update data from the electronic device to a memory unit thereof, thereby completing a firmware update of the USB hub device.

18 Claims, 7 Drawing Sheets

USB HUB DEVICE HAVING FUNCTIONALITY OF SELF FIRMWARE UPDATING AND HOST ELECTRONIC SYSTEM HAVING THE SAME

BACKGROUND OF THE INVENTION

1. Field of the Invention

The present invention relates to the technology field of USB hubs, and more particularly to a USB hub device having functionality of self firmware updating and a host electronic system integrated with the forgoing USB hub device.

2. Description of the Prior Art

Universal serial bus (USB) is known a data transmission interface capable of supporting plug and play (PnP). Nowadays, USB interfaces are widely applied in achieving data transmission between a personal computer and various electronic peripheral devices, such as mouse, keyboard, printer, scanner, pen storage drive, hard disk drive, optical disk drive, and game controller. In communication protocol of USB, after a device-end device (or called slave-end device) is given an address by a host-end device, data communication is then able to be executed between the host-end device and the slave-end device through universal serial bus. As described in more detail below, the host-end device has address 0 in the USB communication protocol, and then assigns a specific address to the slave-end device as well as discovering the slave-end device's capabilities in a process called enumeration. It is worth mentioning that, the above-mentioned enumeration is executed when a new slave-end device is connected to the host-end device. For example, a personal computer (PC) and a small flash drive that is connected to the PC respectively act as a host-end device and a slave-end device in USB communication protocol.

It should be known that, USB hub is an electronic device that is developed for letting a host-end device be able to achieve data transmission with multi slave-end devices simultaneously. For instance, a PC or an in-vehicle infotainment (IVI) system is a host electronic system that is integrated with an internal USB hub. The internal USB hub has an upstream port for being coupled to a host-end USB controller of the IVI system, and also has a plurality of downstream ports for being respectively coupled to different slave-end devices, such that the host-end USB controller can achieve data transmission with one or more of the slave-end devices. However, the above-mentioned internal USB hub needs to have a firmware update in some special cases. For example, after an operating system (OS) of the IVI system has been updated, it is necessary to correspondingly update the firmware of the internal USB hub. On the other hand, in case of the IVI system failing to identify a new USB electronic device that is coupled to one of the plurality of downstream ports of the internal USB hub, it is also necessary to apply a firmware update to the internal USB hub.

Nowadays, the internal USB hub contained in a host electronic system commonly has a microprocessor. As such, when there is a need to apply a firmware update to the internal USB hub, it is able to install a special application program in the operating system of the host electronic system, thereby utilizing the special application program to complete the firmware update of the internal USB hub. On the other hand, by operating the special application program, a maintenance engineer is facilitated in setting configurations of the internal USB hub of the host electronic system.

However, it is difficult or impossible for generic users to apply the firmware update to their host electronic systems integrated with internal USB hub, for example, IVI system, smart TV, KIOSK, and so on. Instead, the generic users can only send their host electronic systems back to corresponding original equipment manufacturers, so as to appoint the original equipment manufacturer to finish the procedure of firmware update. It is easily extrapolated that, it may take some time to complete the firmware update of the internal USB hub for the original equipment manufacturer, certainly causing inconvenience of the users.

From above descriptions, there is still room for improvement in the host electronic systems integrated with internal USB hub. For example, IVI system, smart TV, KIOSK, and so on. In view of that, inventors of the present application have made great efforts to make inventive research and eventually provided a USB hub device having functionality of self firmware updating and a host electronic system integrated with the forgoing USB hub device.

SUMMARY OF THE INVENTION

The primary objective of the present invention is to disclose a USB hub device having functionality of self firmware updating and a host electronic system integrated with the forgoing USB hub device. The USB hub device is integrated in the host electronic system, and comprises an upstream port, a plurality of downstream ports and a hub module comprising a plurality of second USB controller units. On the other hand, the host electronic system has a second USB controller unit. After one first electronic device is coupled to one downstream port, the first USB controller unit sends a detection signal for verifying whether the first electronic device includes at least one firmware update data or not. In case of the first electronic device being verified to have the firmware update data, the hub module transmit the firmware update data from the first electronic device to a memory unit thereof, thereby completing a firmware update of the USB hub device.

It is worth explaining that, during copying the firmware update data from the first electronic device that is coupled to one of the plurality of downstream ports to the internal memory unit, at least one of the other downstream ports can be electrically connected with a second electronic device for letting the first USB controller unit achieve a data transmission with the second electronic device through the upstream port, the hub module and the downstream port.

In order to achieve the primary objective of the present invention, inventors of the present invention provides an embodiment for the USB hub device having functionality of self firmware updating, comprising:

a light an upstream port;

a hub module, being coupled to the upstream port, and comprising a plurality of first USB controller units and a memory unit; and a plurality of downstream ports, being coupled to the hub module;

wherein after one electronic device is electrically connected to one of the plurality of downstream ports, one of the plurality of first USB controller units sending a detection signal for verifying whether the electronic device includes at least one firmware update data or not;

wherein in case of the electronic device being verified to include the firmware update data, the first USB controller unit switching the hub module to a firmware update mode, and copying the firmware update data to the memory unit, thereby completing a firmware update of the USB hub device.

For achieving the primary objective, inventors of the present invention provides an embodiment for the host electronic system, comprising at least one internal USB hub, and being characterized in that the internal USB hub comprises:

a hub module, comprising a plurality of first USB controller units and a memory unit; and
an upstream port, being coupled to the hub module; and
a plurality of downstream ports, being coupled to the hub module;
wherein after one electronic device is electrically connected to one of the plurality of downstream ports, one of the plurality of first USB controller units sending a detection signal for verifying whether the electronic device includes at least one firmware update data or not;
wherein in case of the electronic device being verified to include the firmware update data, the first USB controller unit switching the hub module to a firmware update mode, and copying the firmware update data to the memory unit, thereby completing a firmware update of the USB hub device.

In one embodiment, the forgoing hub module further comprises:
a first physical layer unit, being coupled to the upstream port;
a hub repeater unit, being coupled to the first physical layer unit;
a transaction translator unit, being coupled to the hub repeater unit;
a routing logic unit, being coupled to the transaction translator unit and the hub repeater unit;
a plurality of physical layer units, being coupled to the routing logic unit;
a controlling unit, being coupled to the hub repeater unit; and
a first-in-first-out (FIFO) memory, being coupled to the controlling unit;
wherein the plurality of first USB controller units are also coupled to the FIFO memory and the routing logic unit.

In one embodiment, the memory unit is included in the controlling unit, and the controlling unit further including a microprocessor that is coupled to the memory unit and a state machine that is coupled to the microprocessor.

In one embodiment, a data detecting unit and a mode switching unit are provided in each of the plurality of first USB controller units by a form of firmware, function library, application program, or operands, such that each of the plurality of first USB controller units utilizes the data detecting unit to generate the detection signal, and to switch the hub module to the firmware update mode by using the mode switching unit.

In one embodiment, the FIFO memory comprises:
a first FIFO buffer unit, being coupled between the controlling unit and the plurality of first USB controller unit;
a second FIFO buffer unit;
a first multiplexer, being coupled between the controlling unit and the second FIFO buffer unit;
a second multiplexer, being coupled between the second FIFO buffer unit and the plurality of first USB controller unit; and
a direct memory access (DMA) unit, being coupled between the second multiplexer and the first multiplexer.

In one embodiment, the detection signal comprises an identifier acquiring command, and the electronic device replying a first descriptor to the first USB controller unit via the downstream port after receiving the identifier acquiring command, so as to let the first USB controller unit acquire at least one device description of the electronic device. In which, the device description includes vendor ID and product ID.

In one embodiment, the detection signal further comprises a firmware update authentication command, and the electronic device replying a second descriptor to the first USB controller unit via the downstream port after receiving the firmware update authentication command, so as to let the first USB controller unit start to apply the firmware update.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a USB hub device having functionality of self firmware updating and a host electronic system integrated with the forgoing USB hub device that are disclosed by the present invention, embodiments of the present invention will be described in detail with reference to the attached drawings hereinafter.

Figure 1:
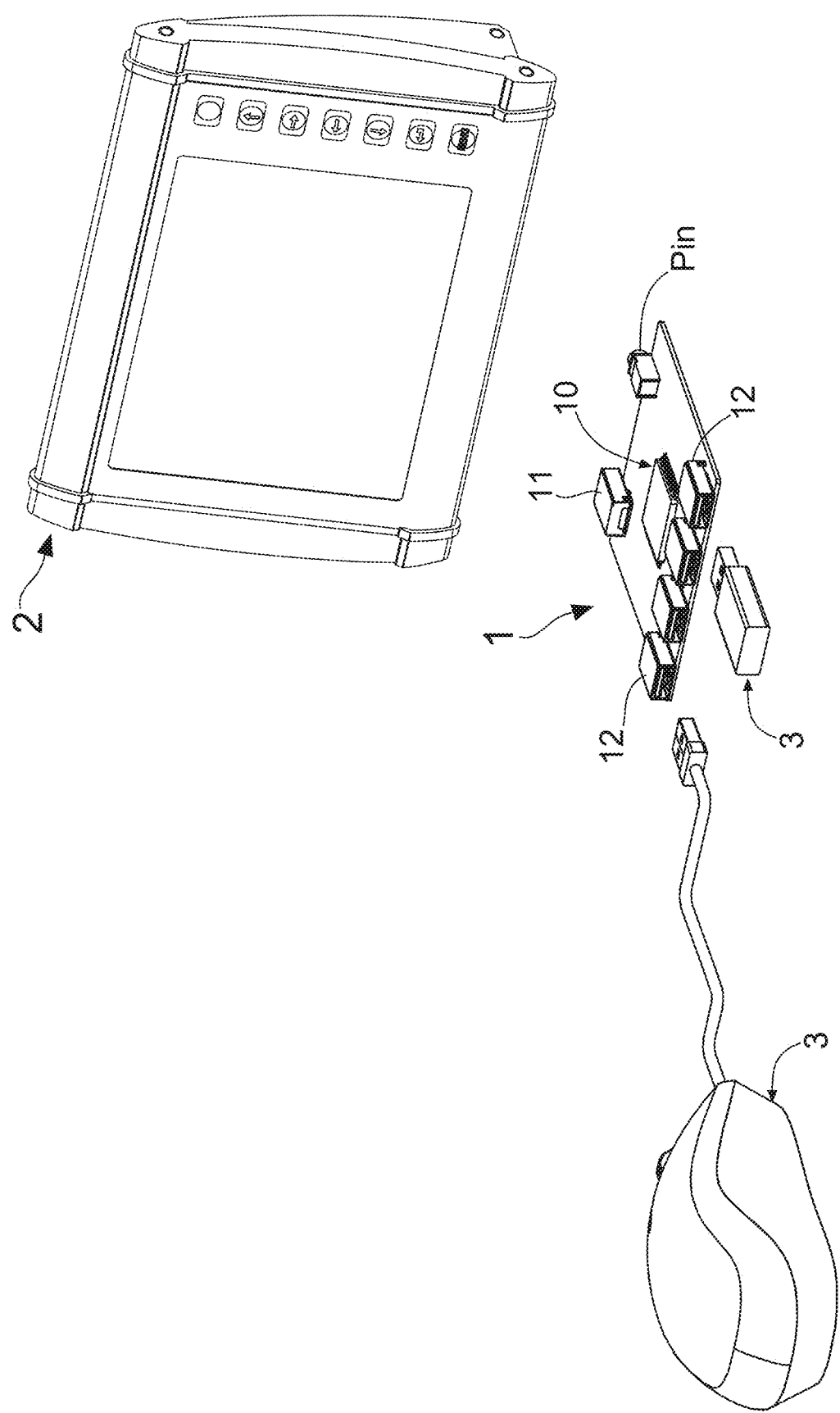
FIG. 1 shows a stereo diagram of a first host electronic system that is integrated with a USB hub device having functionality of self firmware updating according to the present invention.
Figure 2:
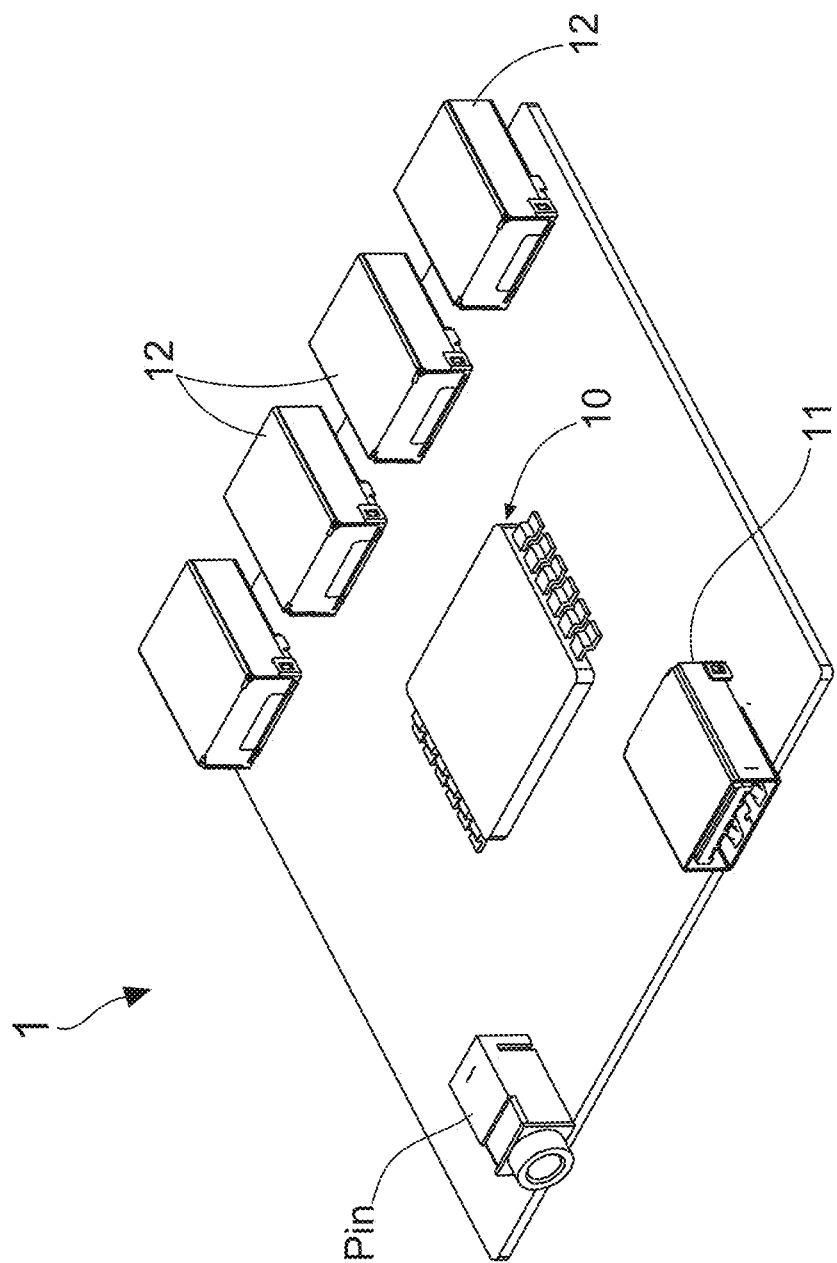
FIG. 2 shows a stereo diagram of the USB hub device having functionality of self firmware updating of the present invention.
Figure 3:
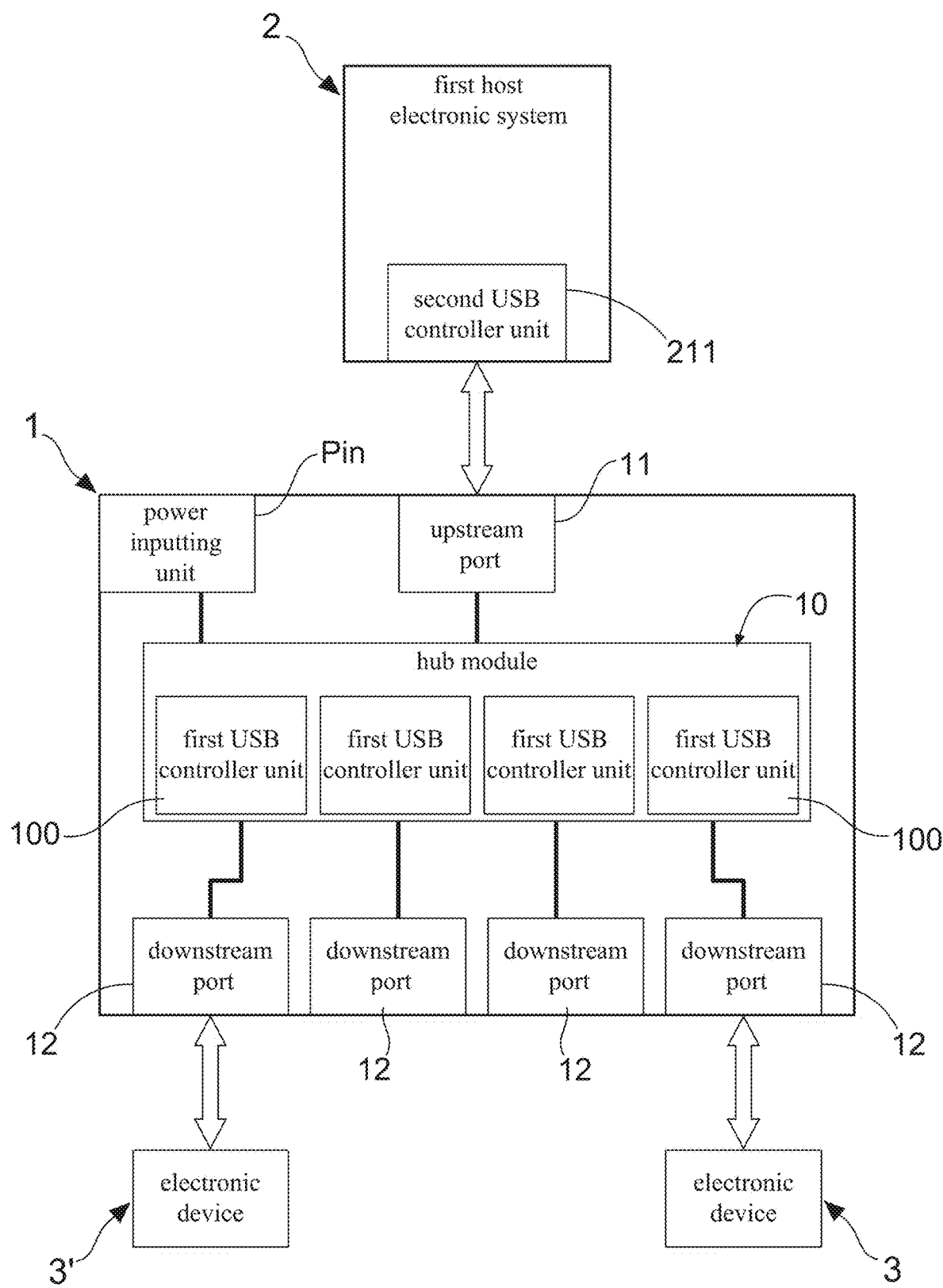
FIG. 3 shows a first block diagram of the USB hub device having functionality of self firmware updating of the present invention.

With reference to FIG. 1, there is shown a stereo diagram of a first host electronic system that is integrated with a USB hub device having functionality of self firmware updating according to the present invention. Moreover, FIG. 2 illustrate a stereo diagram of the USB hub device having functionality of self firmware updating, and FIG. 3 shows a first block diagram of the USB hub device of the present invention. Particularly, the present invention discloses a USB hub device 1, having a functionality of firmware self-updating, is able to be applied as an internal USB hub of a first host electronic system 2. FIG. 1 depicts that the first host electronic system 2 is an in-vehicle infotainment (IVI) system, but the IVI system is not a limit embodiment of the first host electronic system. In the broadest sense, the forgoing first host electronic system 2 mentioned herein is an electronic product that is integrated with an internal USB hub, and it is difficult or impossible for generic users to apply a firmware update to the first host electronic system 2 by using their personal computers. For example, the first host electronic system 2 can be an IVI system, video playing system, smart TV, smart speaker, KIOSK, electronic measurement equipment, server, and so on.

As FIG. 1, FIG. 2 and FIG. 3 show, the USB hub device 1 of the present invention comprises: an upstream port 11, a hub module 10 and a plurality of downstream ports 12, wherein the hub module 10 is coupled to the upstream port 11 that is used for electrically connected to a second USB controller unit 211 of a host electronic system 2. Moreover, the plurality of downstream ports 12 are coupled to the hub module 10, and the hub module 10 comprises a plurality of first USB controller units 100 and a memory unit.

One of the principal technology features of the USB hub device 1 is that the hub module 10 is designed to include multi USB controller units 100. By such arrangement, after one electronic device 3 is electrically connected to one of the multi downstream ports 12, one of the multi first USB controller units 100 sends a detection signal for verifying whether the electronic device 3 includes at least one firmware update data or not. Subsequently, in case of the electronic device 3 being verified to include the firmware update data, the first USB controller unit 100 switches the hub module 10 to a firmware update mode, and then copies the firmware update data to the memory unit of the hub module 10, thereby completing a firmware update of the USB hub device 1 (i.e., the hub module 10).

For example, after a flash drive (i.e., the electronic device 3) is electrically connected to the downstream port 12 of the USB hub device 1, the first USB controller unit 100 sends a detection signal to the flash drive via the downstream port 12. The detection signal comprises an identifier acquiring command, and the electronic device 3 (i.e., the flash drive) replies a first descriptor to the first USB controller unit 100 via the downstream port 12 after receiving the identifier acquiring command, so as to let the first USB controller unit 100 acquire at least one device description of the electronic device 3. The device description at least includes vendor ID and product ID. Next, the first USB controller unit 100 sends a firmware update authentication command to the flash drive, and the flash drive replies a second descriptor to the first USB controller unit 100 via the downstream port 12 after receiving the firmware update authentication command According to the second descriptor, the firmware update data stored in the flash drive is detected, such that the first USB controller unit 100 starts to apply the firmware update of the USB hub device 1 (i.e., the hub module 10).

Briefly speaking, by sending the detection signal comprising a an identifier acquiring command and the firmware update authentication command, the first USB controller unit 100 is able to complete a firmware update data verification after an electronic device 3 is electrically connected to one of the multi downstream ports 12 of the USB hub device 1, so as to subsequently apply a firmware update to the hub module 10 of the USB hub device 1 in case of the electronic device 3 being verified to include the firmware update data. Of course, under the condition of a firmware version of the hub module 10 is the latest, the firmware update would not be executed by the first USB controller unit 100.

Figure 4:
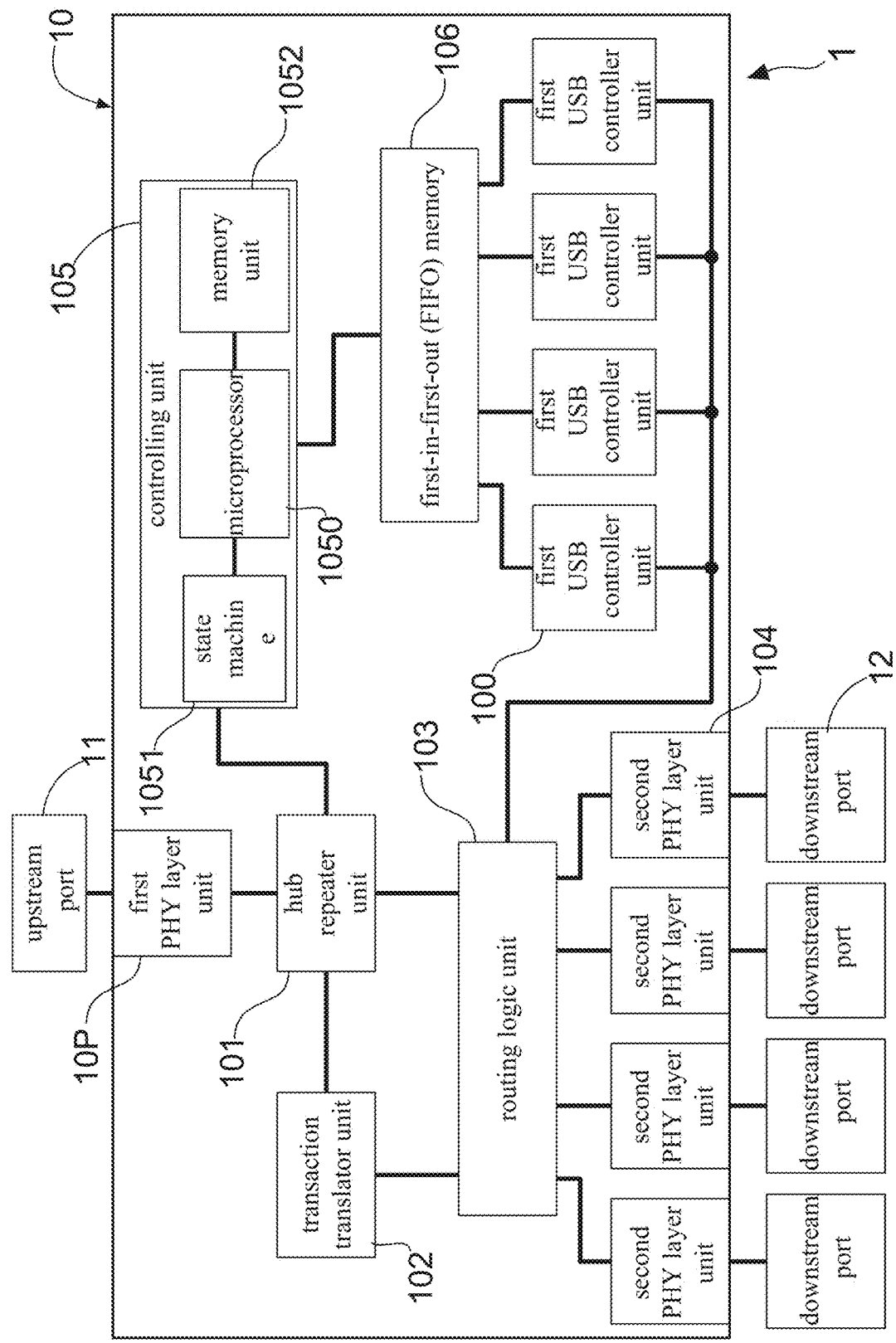
FIG. 4 shows a block diagram of a hub module of the USB hub device having functionality of self firmware updating.

Referring to FIG. 1, FIG. 2 and FIG. 3 again, and please refer to FIG. 4 showing a block diagram of the hub module 10 of the USB hub device 1. In one embodiment, the hub module 10 further comprises a first physical layer unit 10P, a hub repeater unit 101, a transaction translator unit 102, a routing logic unit 103, a plurality of physical layer units 104, a controlling unit 105, and a first-in-first-out (FIFO) memory 106. As FIG. 4 shows, the first physical layer unit 10P is coupled to the upstream port 11, the hub repeater unit 101 is coupled to the first physical layer unit 10P, and the transaction translator unit 102 is coupled to the hub repeater unit 101. Moreover, the routing logic unit 103 is coupled to the transaction translator unit 102 and the hub repeater unit 101, the multi physical layer units 104 are coupled to the routing logic unit 103, the controlling unit 105 is coupled to the hub repeater unit 101, and the first-in-first-out (FIFO) memory 106 is coupled to the controlling unit 105. FIG. 4 also depicts that the plurality of first USB controller units 100 are also coupled to the FIFO memory 106 and the routing logic unit 103.

The above-mentioned hub repeater unit 101, transaction translator unit 102 and routing logic unit 103 are belong to necessary circuit units for constituting a traditional USB hub, such that engineers skilled in development and manufacture of USB hubs certainly know functions of the hub repeater unit 101, the transaction translator unit 102 and the routing logic unit 103. It is worth further explaining that, the memory unit 1052 of the hub module 10 is included in the controlling unit 105, and the controlling unit 105 further includes a microprocessor 1050 that is coupled to the memory unit 1052 and a state machine 1051 that is coupled to the microprocessor 1050. In addition, FIG. 3 also depicts that the USB hub device 1 further comprises a power inputting unit Pin, which is coupled to the hub module 10, and is adopted for electrically connected to a power supply unit.

Figure 5:
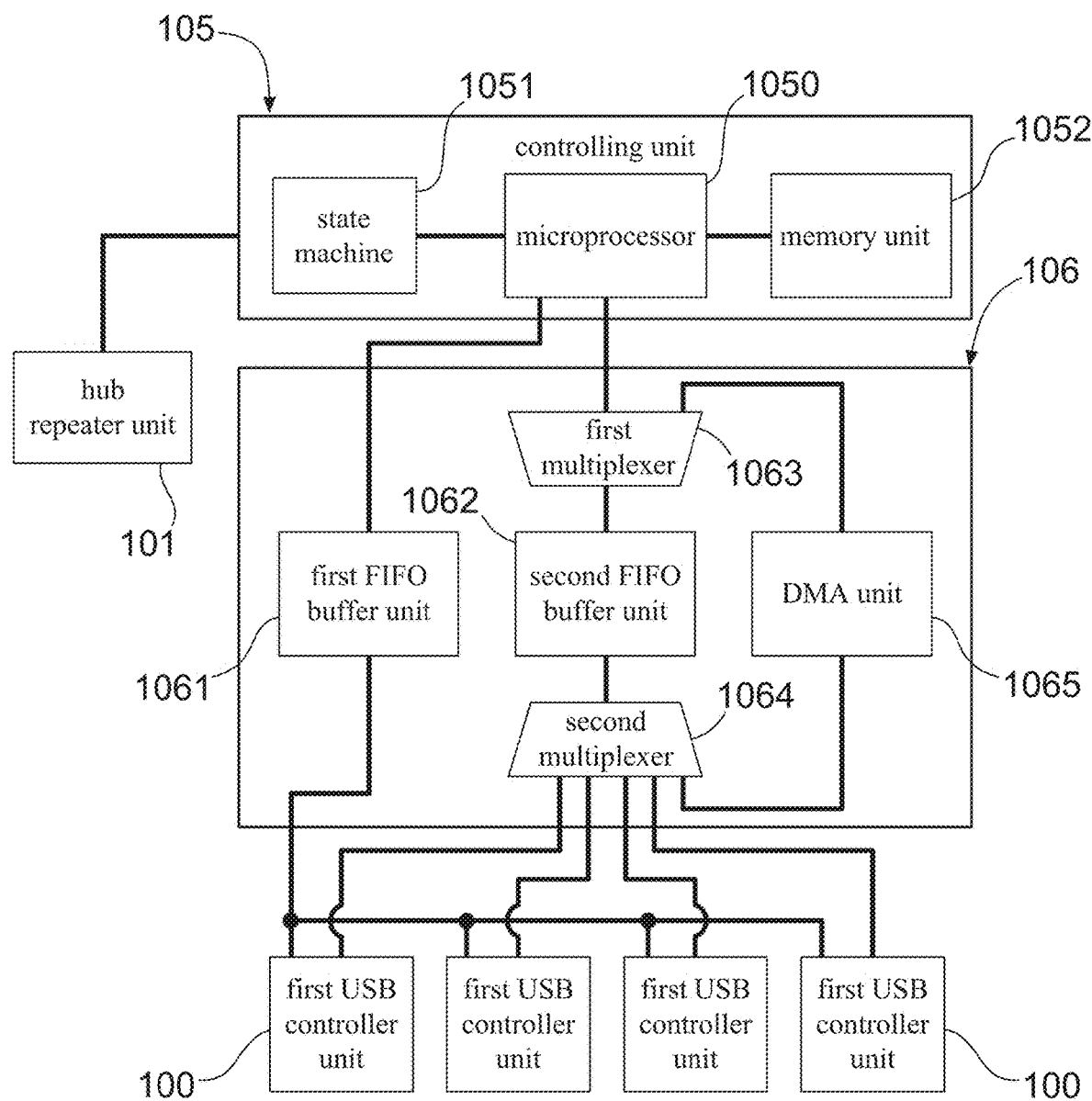
FIG. 5 shows a block diagram of a first-in-first-out (FIFO) memory of the hub module.

Referring to FIG. 1, FIG. 2, FIG. 3, and FIG. 4 again, and please refer to FIG. 5 showing a block diagram of a first-in-first-out (FIFO) memory 106 of the hub module 10. In one embodiment, the FIFO memory 106 comprises a first FIFO buffer unit 1061, a second FIFO buffer unit 1062, a first multiplexer 1063, a second multiplexer 1064, and a direct memory access (DMA) unit 1065. In which, the first FIFO buffer unit 1061 is coupled between the controlling unit 105 and the plurality of first USB controller unit 100, and the first multiplexer 1063 is coupled between the controlling unit 105 and the second FIFO buffer 1062. Moreover, the second multiplexer 1064 is coupled between the second FIFO buffer unit 1062 and the plurality of first USB controller unit 100, and the direct memory access (DMA) unit 1065 is coupled between the second multiplexer 1064 and the first multiplexer 1063.

It needs to further explain that, if there is a need to edit a data that is transmitted between the controlling unit 105 and the FIFO memory 106 or a data that is transmitted between the first USB controller unit 100 and the FIFO memory 106, an external host computer is adopted for accessing the data that has been temporarily stored in the second FIFO buffer unit 1062, so as to achieve an edit procedure of the data. Consequently, the data that has been treated with a data edit is stored back to the second FIFO buffer unit 1062.

In a practicable embodiment, a data detecting unit and a mode switching unit are provided in each of the plurality of first USB controller units 100 by a form of firmware, function library, application program, or operands, such that each of the plurality of first USB controller units 100 utilizes the data detecting unit to generate the detection signal, and to switch the hub module 10 to the firmware update mode by using the mode switching unit. By such design, during copying the firmware update data from one electronic device 3 that is coupled to one of the multi downstream ports 12 to the internal memory unit 1052 of the hub module 10, at least one of the other downstream ports 12 can be electrically connected with another one electronic device 3 (like a mouse shown in FIG. 2) for letting the first USB controller unit 100 achieve a data transmission with the another one electronic device 3 through the corresponding downstream port 12, the hub module 10 and the upstream port 11.

Figure 6:
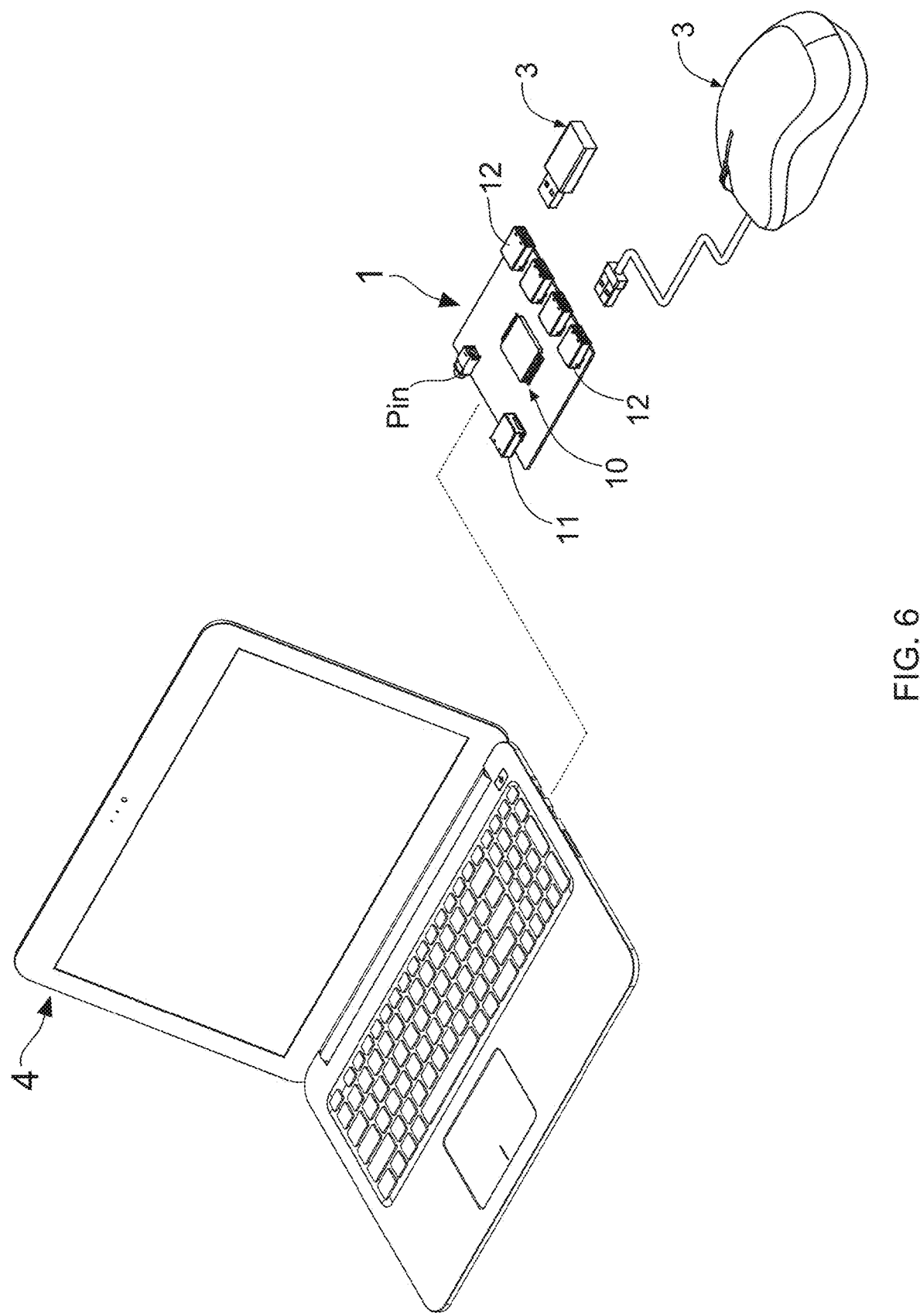
FIG. 6 shows a stereo diagram of a second host electronic system having the USB hub device having functionality of self firmware updating according to the present invention.
Figure 7:
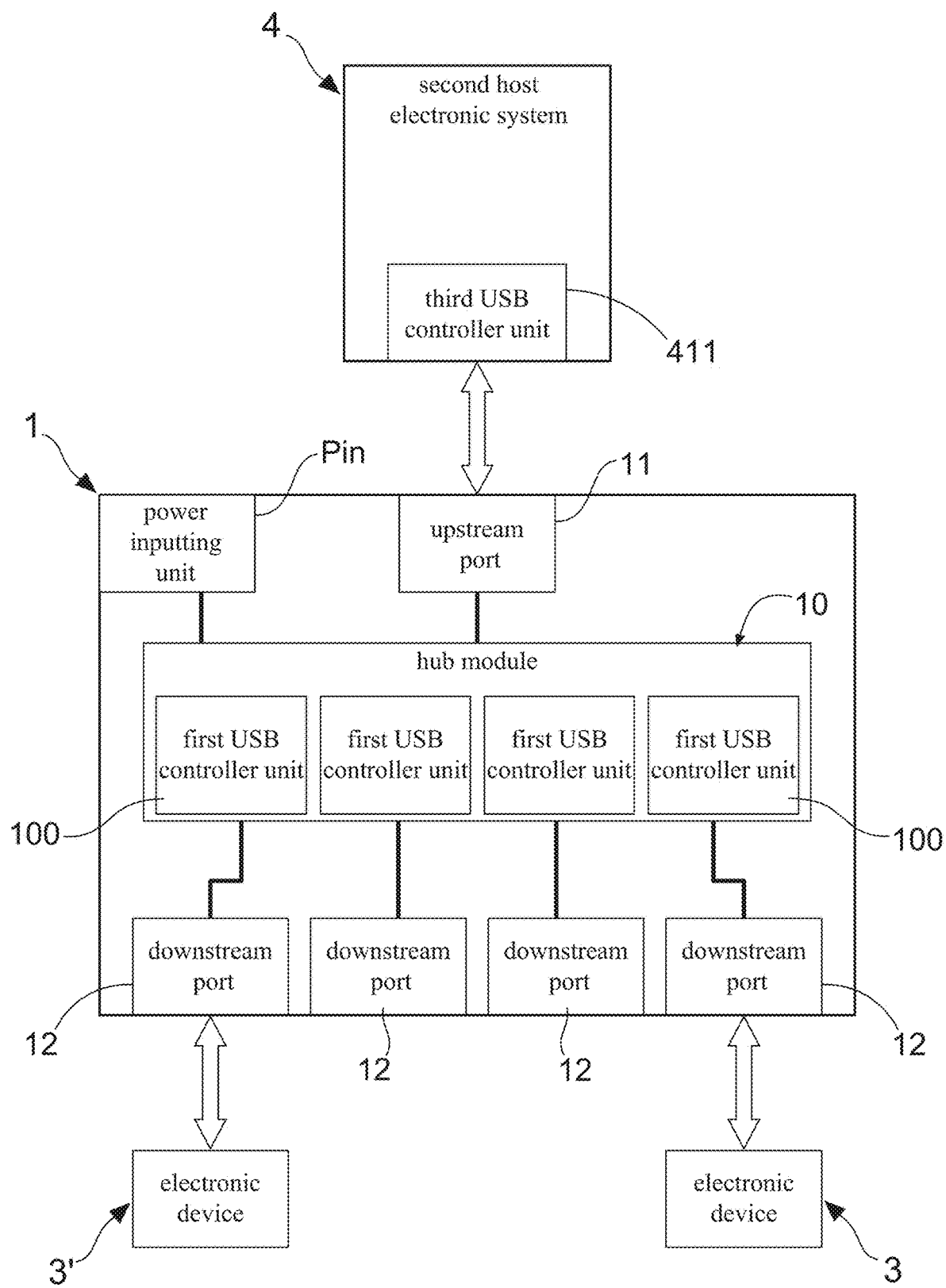
FIG. 7 shows a second block diagram of the USB hub device having functionality of self firmware updating of the present invention.

With reference to FIG. 6, there is shown a stereo diagram of a second host electronic system that is integrated with a USB hub device having functionality of self firmware updating according to the present invention. Moreover, FIG. 7 illustrates a second block diagram of the USB hub device of the present invention. the present invention discloses a USB hub device 1, having a functionality of firmware self-updating, is able to be applied as an internal USB hub of a second host electronic system 4. FIG. 6 and FIG. 7 depict that the second host electronic system 4 is a laptop computer has a third USB controller unit 411. In the broadest sense, however, the forgoing second host electronic system 4 mentioned herein is an electronic product that is integrated with an internal USB hub, and generic users are allowed to apply a firmware update to the internal USB hub of the second host electronic system 4 by using a special application program that is installed in an operating system (OS) of the second host electronic system 4. In a practicable embodiment, the second host electronic system 4 can be a desk computer, a laptop computer, an all-in-one desk computer, or a table PC. As such, when there is a need to apply a firmware update to the internal USB hub, maintenance engineers and/or the generic users are able to operate the special application program so as to complete the firmware update of the internal USB hub. On the other hand, by operating the special application program, they are also facilitated in setting configurations of the internal USB hub of the host electronic system 4.

The above description is made on embodiments of the present invention. However, the embodiments are not intended to limit scope of the present invention, and all equivalent implementations or alterations within the spirit of the present invention still fall within the scope of the present invention.

What is claimed is:

1. A USB hub device having functionality of self firmware updating, comprising:
   an upstream port;
   a hub module, being coupled to the upstream port, and comprising a plurality of first USB controller units and a memory unit; and
   a plurality of downstream ports, being coupled to the hub module;
   wherein each said first USB controller unit is provided with a first program and a second program therein;
   wherein the first program including instructions for configuring said first USB controller unit to verify whether an electronic device electrically connected to one said downstream port includes a firmware update data or not; and
   wherein the second program including instructions for configuring said first USB controller unit to copy the firmware update data to the memory unit, in case of said electronic device is verified to include said firmware update data, thereby accomplishing a firmware update of the USB hub device by using the firmware update data;
   wherein the hub module further comprises:
   a first physical layer unit, being coupled to the upstream port;
   a hub repeater unit, being coupled to the first physical layer unit;
   a transaction translator unit, being coupled to the hub repeater unit;
   a routing logic unit, being coupled to the transaction translator unit and the hub repeater unit;
   a second physical layer unit, being coupled to the routing logic unit;
   a controlling unit, being coupled to the hub repeater unit; and
   a first-in-first-out (FIFO) memory, being coupled to the controlling unit;
   wherein the plurality of first USB controller units is also coupled to the FIFO memory and the routing logic unit.

2. The USB hub device of claim 1, further comprising a power inputting unit, being coupled to the hub module, and being adopted for electrically connected to a power supply unit.

3. The USB hub device of claim 1, wherein the upstream port is used for electrically connected to a second USB controller unit of a host electronic system.

4. The USB hub device of claim 1, wherein the memory unit is included in the controlling unit, and the controlling unit further including a microprocessor that is coupled to the memory unit and a state machine that is coupled to the microprocessor.

5. The USB hub device of claim 4, wherein a data detecting unit and a mode switching unit are provided in each of the plurality of first USB controller units by a form of firmware, function library, application program, or operands, such that each of the plurality of first USB controller units utilizes the data detecting unit to generate the detection signal, and to switch the hub module to the firmware update mode by using the mode switching unit.

6. The USB hub device of claim 1, wherein the FIFO memory comprises:
   a first FIFO buffer unit, being coupled between the controlling unit and the plurality of first USB controller unit;
   a second FIFO buffer unit;
   a first multiplexer, being coupled between the controlling unit and the second FIFO buffer;
   a second multiplexer, being coupled between the second FIFO buffer unit and the plurality of first USB controller unit; and
   a direct memory access (DMA) unit, being coupled between the second multiplexer and the first multiplexer.

7. The USB hub device of claim 1, wherein the detection signal comprises an identifier acquiring command, and the electronic device replying a first descriptor to the first USB controller unit via the downstream port after receiving the identifier acquiring command, so as to let the first USB controller unit acquire at least one device description of the electronic device.

8. The USB hub device of claim 7, wherein the detection signal further comprises a firmware update authentication command, and the electronic device replying a second descriptor to the first USB controller unit via the downstream port after receiving the firmware update authentication command, so as to let the first USB controller unit start to apply the firmware update.

9. The USB hub device of claim 7, wherein the device description includes vendor ID and product ID.

10. The USB hub device of claim 7, being integrated in a host electronic system for being as an internal USB hub.

11. A host electronic system, comprising at least one internal USB hub, and being characterized in that the internal USB hub comprises:
  a hub module, comprising a plurality of first USB controller units and a memory unit; and
  an upstream port, being coupled to the hub module; and
  a plurality of downstream ports, being coupled to the hub module;
  wherein each said first USB controller unit is provided with a first program and a second program therein;
  wherein the first program including instructions for configuring said first USB controller unit to verify whether an electronic device electrically connected to one said downstream port includes a firmware update data or not; and
  wherein the second program including instructions for configuring said first USB controller unit to copy the firmware update data to the memory unit, in case of said electronic device is verified to include said firmware update data, thereby accomplishing a firmware update of the USB hub device by using the firmware update data;
  wherein the hub module further comprises:
  a first physical layer unit, being coupled to the upstream port;
  a hub repeater unit, being coupled to the first physical layer unit;
  a transaction translator unit, being coupled to the hub repeater unit;
  a routing logic unit, being coupled to the transaction translator unit and the hub repeater unit;
  a second physical layer unit, being coupled to the routing logic unit;
  a controlling unit, being coupled to the hub repeater unit; and
  a first-in-first-out (FIFO) memory, being coupled to the controlling unit;
  wherein the plurality of first USB controller units is also coupled to the FIFO memory and the routing logic unit.

12. The host electronic system of claim 11, wherein the internal USB hub further comprises a power inputting unit, being coupled to the hub module, and being adopted for electrically connected to a power supply unit.

13. The host electronic system of claim 11, wherein the memory unit is included in the controlling unit, and the controlling unit further including a microprocessor that is coupled to the memory unit and a state machine that is coupled to the microprocessor.

14. The host electronic system of claim 13, wherein a data detecting unit and a mode switching unit are provided in each of the plurality of first USB controller units by a form of firmware, function library, application program, or operands, such that each of the plurality of first USB controller units utilizes the data detecting unit to generate the detection signal, and to switch the hub module to the firmware update mode by using the mode switching unit.

15. The host electronic system of claim 11, wherein the FIFO memory comprises:
  a first FIFO buffer unit, being coupled between the controlling unit and the plurality of first USB controller unit;
  a second FIFO buffer unit;
  a first multiplexer, being coupled between the controlling unit and the second FIFO buffer unit;
  a second multiplexer, being coupled between the second FIFO buffer unit and the plurality of first USB controller unit; and
  a direct memory access (DMA) unit, being coupled between the second multiplexer and the first multiplexer.

16. The host electronic system of claim 11, wherein the detection signal comprises an identifier acquiring command, and the electronic device replying a first descriptor to the first USB controller unit via the downstream port after receiving the identifier acquiring command, so as to let the first USB controller unit acquire at least one device description of the electronic device.

17. The host electronic system of claim 16, wherein the detection signal further comprises a firmware update authentication command, and the electronic device replying a second descriptor to the first USB controller unit via the downstream port after receiving the firmware update authentication command, so as to let the first USB controller unit start to apply the firmware update.

18. The host electronic system of claim 16, wherein the device description includes vendor ID and product ID.

* * * * *